United States Patent Office 2,988,519
Patented June 13, 1961

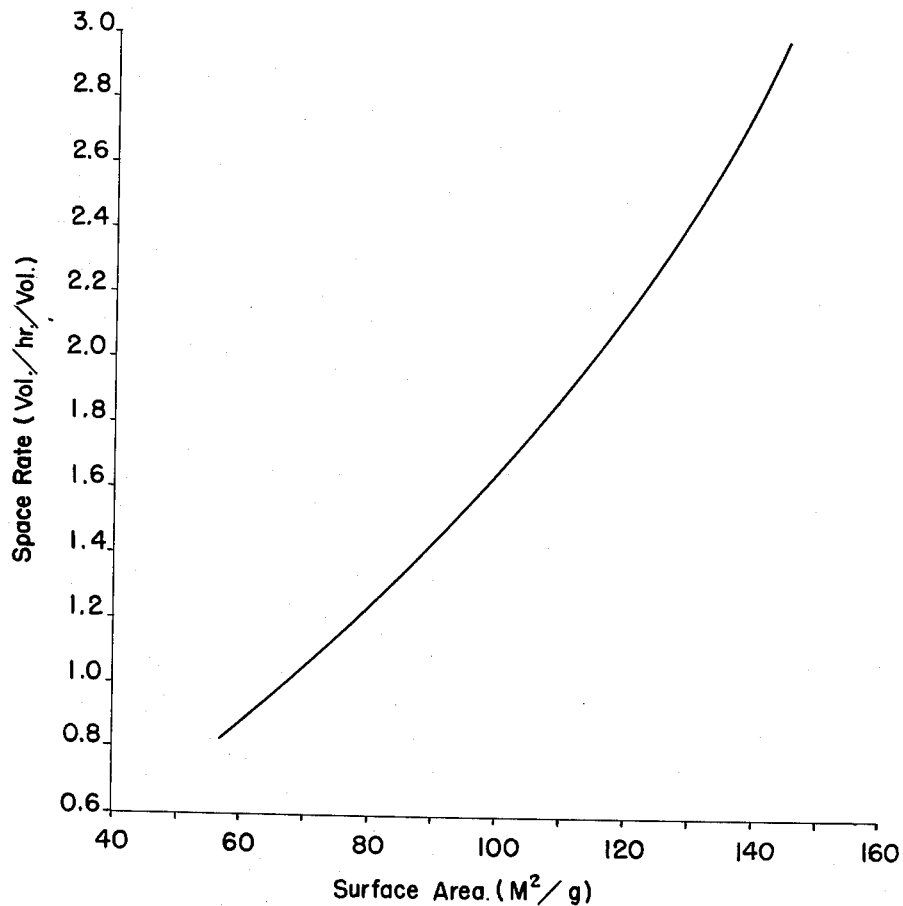

2,988,519
ACTIVATION OF CLAY BY ACID TREATMENT AND CALCINATION IN THE PRESENCE OF CARBONACEOUS MATERIAL
Alfred J. Robinson, Philadelphia, Pa., and James V. Weir, Milltown, N.J., assignors to Minerals & Chemicals Philipp Corporation, a corporation of Maryland
Filed Oct. 18, 1955, Ser. No. 541,176
12 Claims. (Cl. 252—450)

This invention relates to an improved process for preparing adsorptive contact masses from naturally occurring acid-activatable clays, and more particularly to such an improved process which involves, among other things, reacting acid-activatable clay with sulfuric acid and then calcining the resulting reacted clay to decompose certain reaction products therein and thus provide a contact mass of superior quality.

The adsorptive contact masses of our invention have usefulness chiefly as catalysts in catalytic cracking processes for cracking petroleum hydrocarbons to make gasoline, but they are also useful as adsorbents for decolorizing vegetable and mineral oils and for various other purposes.

In our copending U.S. application, Serial No. 490,128, filed February 23, 1955, we have disclosed a novel process for preparing adsorptive contact masses from kaolin clay. As disclosed in such application, our process involves mixing sulfuric acid and clay together to form a plastic mass, after which the clay and acid are maintained in intimate contact under such conditions of time and temperature as to permit substantial reaction between the clay, specifically the alumina of the clay, and the acid. The reacted mixture is then calcined at a temperature sufficiently high to decompose the aluminum sulfate formed as a result of the reaction, thereby to form the final product.

The above-mentioned step of maintaining the clay and acid in intimate contact to promote reaction therebetween is hereinafter referred to as aging. In the process covered by our copending U.S. application, Serial No. 490,128, the aging is carried out preferably in air.

In another copending U.S. patent application, of Serial No. 449,515, filed April 5, 1955, we have disclosed an improvement in the aforesaid process. This improvement involves aging of the clay-acid mixture in hot oil. Through the use of an oil bath, aging of the clay-acid mixture is accomplished in a much shorter time and the resulting contact masses possess improved characteristics such, for example, as greater hardness than is the case when contact masses are produced in a similar manner but aged in air.

Hereinafter, for simplicity's sake, these processes of our aforesaid copending U.S. patent applications will be referred to as "dry processes" to distinguish them from the heretofore known methods of activating clay with acid which we will refer to as "wet processes" since they entail aqueous leaching of the clay-acid reaction product to remove soluble salts therefrom.

The purpose of the calcination step in our dry processes is to decompose aluminum sulfate in the clay-acid reaction mixture, thus bringing about the elimination of gaseous oxides of sulfur therefrom with accompanying transition of the residue to a high-quality adsorptive contact material.

The decomposition temperature of aluminum sulfate is about 1418° F. and consequently, as pointed out in our aforesaid copending application of Serial No. 490,128, the reacted clay is calcined preferably at a temperature of about 1450° F. or above in order to effect the desired sulfate decomposition.

The present invention constitutes an improvement in the dry processes covered by our said two copending patent applications. Our invention is the result of the discovery that the incorporation of relatively small amounts of carbonaceous materials, as hereinafter more fully identified, into the clay-acid mixtures makes it possible to desulfate the reacted clay at comparatively low temperatures of calcination. More specifically, by the incorporation of a carbonaceous material into the clay-acid mixture it is possible to effect decomposition of aluminum sulfate in the reacted clay at a lower calcination temperature, all other things being equal, than is possible in the absence of the carbonaceous material. In addition to this heat saving benefit, the use of a carbonaceous additive as taught herein also possesses the advantage of bringing about improved activity in the resulting contact masses.

Accordingly, it is one object of the present invention to provide an improved process for preparing adsorptive contact masses from clay.

Another object of the invention is to provide an improvement in the preparation of adsorptive contact masses from clay by reacting clay with sulfuric acid and then calcining the reacted clay to decompose the resulting aluminum sulfate, whereby the calcination can be carried out at a temperature below the normal decomposition temperature of aluminum sulfate. A further object of the invention is to provide an improved process for preparing hydrocarbon cracking catalysts of superior quality.

Other objects and features of the invention will be apparent from the detailed description thereof and examples which follow.

In accordance with our invention an acid-activatable clay, preferably kaolin clay, is mixed with acid to an appearance of homogeneity in any conventional mixer suitable for this purpose as, for example, a pug mill.

While we prefer to use degritted raw clay (that which has been refined only to the extent that grit, foreign bodies and clots of undispersed clay have been eliminated) as a starting material in our process, we wish to have it clearly understood that the invention is not limited to the treatment of such a product. Clays which have received other preliminary treatments may still be amenable to processing in accordance with the teachings of our patent. Examples of preliminary treatments falling within this category are deironing by physical or chemical methods, conventional classifying operations, and even partial acid activation by the previously mentioned wet procedures. The volatile matter content (V.M.) of the starting clay should preferably not be so high as to make for to dilute a mixture of clay, acid, and carbonaceous material for optimum handling under the conditions of the particular processing involved. We have obtained excellent results using a starting clay of about 14 percent V.M. with moderate dosages of concentrated sulfuric acid in conjunction with optimum quantities of preferred carbonaceous material.

For our process, we prefer to use concentrated sulfuric acid, as, for example the commercially available 66° Bé. (about 93 percent $H_2SO_4$) grade, adding water to the mix, if necessary, to improve its workability. However, any strength acid consistent with proper plasticity of mix for the dosage employed can be used within the scope of our invention. We prefer to use acid dosages from about 60 percent to about 100 percent in our process, acid dosage being defined as the weight of 100 percent acid per weight of volatile free clay expressed on a percentage basis. By volatile free clay is meant that which has been heated to essentially constant weight at about 1700° F. Although acid dosages much lower than 60 percent, down to as low as 20 percent in fact, can be used in our process with some benefit, the clay conversion gradually falls off with decreasing dosage until ineffectual levels are reached. With the lower dosages of acid, it has usually been found necessary to have higher water/acid ratios in the mix than will suffice for more normal dosages, the principal reason for this being to adjust the said mixes to conditions of optimum plasticity for working. On the other hand, higher acid dosage, particularly on a clay of relatively coarse particle size, sometimes produces a mixture too thin for adequate workability. In this event, the situation can frequently be remedied by either grinding the clay prior to acid addition or by substituting fuming sulfuric acid for the more dilute acid conventionally used. Although our preferred range of acid dosage has been given as that from about 60 percent to about 100 percent, dosages higher than 100 percent can be used within the scope of our invention so long as a workable mix is obtainable in the process. Approximately 130 percent dosage represents the amount of acid that would be required for substantially complete reaction with an average kaolin clay.

In accordance with our invention there is incorporated into the clay-acid mixture a carbonaceous material in an amount specified hereinafter. It is to be understood that the sequence in which the clay, acid and carbonaceous materials are added one to the other is immaterial and, as a matter of fact, the three ingredients may be mixed simultaneously if desired. The carbonaceous materials of our invention can be liquids, semi-solids or solids, so long as they are amenable to admixture with the clay and acid ingredients. Obviously they should not contain significant amounts of inorganic constituents which would form undesirable deposits on the contact masses; nor should they contain significant proportions of any materials or substituent groups which would react with or otherwise affect the clay-acid reaction mixtures to the detriment of the final products.

A great variety of carbonaceous materials are operative within the scope of our invention. One group of carbonaceous materials suitable for use in the present invention comprises finely divided organic solids such as those which have heretofore been incorporated into clay or clay-like contact masses and subsequently burned out for the purpose of creating porosity within the said masses. Examples of this type of carbonaceous additive are wood flour, corn meal, saw dust and the like. The function of these carbonaceous materials in our clay-acid reaction mixture is of course entirely different from their prior art function of acting as temporary fillers which are added simply to create voids in clay or clay-like masses upon combustion thereof.

Obviously, a great many carbon containing mixtures such as various industrial waste products, petrolum fractions, tarry and asphaltic residues, etc. are excellent additives for purposes of our invention. In addition, a vast array of organic compounds (and mixtures thereof) are suitable carbonaceous substances for use as taught herein, among these being hydrocarbons of all types, alcohols (including polyhydric alcohols), esters, amines, organic acids, aldehydes, ketones, derivatives of these compounds, organic polymerization products, carbohydrates and numerous others.

We have found finely divided amorphous carbon to be particularly useful for the purposes of our invention. By amorphous carbon is meant such materials as powdered coke, lampblack, powdered coal, the so-called activated carbons of commerce, and so forth.

The amount of carbonaceous material to be used in accordance with our process preferably is such as to contain from 3 to 20 parts by weight of carbon, either combined or free, per 100 parts of anhydrous sulfuric acid in the clay-acid mixture. By way of example, if amorphous carbon is utilized as the carbonaceous material there would be preferably added to the clay and acid from 3 to 20 parts by weight of the carbon per 100 parts of anhydrous sulfuric acid used. On the other hand, if glycerol is employed as the carbonaceous material it is preferable to add from 7.7 to 51 parts thereof per 100 parts of anhydrous sulfuric acid used. It is to be understood that even greater amounts of the carbonaceous material may be utilized. However, no additional benefits result from use of such excess; in fact in some cases the hardness of the finished contact masses may be somewhat lower with the excess than without it. Moreover, in the case of liquid carbonaceous materials such as glycerol, the quantity of carbonaceous material which can be tolerated may be somewhat limited in view of the necessity of forming the clay, acid, carbonaceous material mixture into shaped masses, as more fully hereinafter disclosed. The quantity requirements which we have found to be particularly suitable for our process appear to correlate with the stoichiometric quantity of carbon required for reaction with sulfate to reduce all of the sulfur in the sulfate to sulfur dioxide with the accompanying oxidation of the carbon to $CO_2$. Thus, such stoichiometric amount of carbon is calculated to be 6.3 parts per 100 parts of anhydrous sulfuric acid. While we have found that such amount of carbon is satisfactory for our purpose, beneficial results may also be obtained with an amount of carbon within the range of 3 to 20 parts per 100 parts of anhydrous sulfuric acid.

After mixing the clay, acid and carbonaceous material to an appearance of homogeneity, the mixture preferably is formed into masses of appropriate sizes by any of the methods to accomplish these purposes well known to those skilled in the art. For example, the forming operation can be performed by extrusion, pilling, or injecting or dropping the mixture into hot oil. For best results in extrusion, the V.M. of the mix should be between about 30 and 65 percent by weight, with the preferred value being in the neighborhood of 50 to 55 percent. As well known to those skilled in the art, when the contact masses are to be employed as catalysts in fixed or moving bed cracking processes, such as, for example, thermofor catalytic cracking (T.C.C.) or Houdriflow operations, the material should be formed into particles ranging in size from about 4-mesh to about 10-mesh, usually in the form of pellets or beads, whereas when they are to be employed as catalysts in fluid catalytic cracking processes the material should be formed into particles ranging in size preferably from about 20 to about 150 microns in equivalent spherical diameter, but in any case with not more than 20 percent, by weight, of the particles being finer than 40 microns in equivalent spherical diameter.

The shaped masses are then aged under such conditions of time and temperature as to preferably bring about substantially complete reaction between the acid and the clay. As disclosed in our copending application of Serial No. 490,128, the aging may be carried out in an air-filled space protected from the surrounding atmosphere. We have found that optimum temperatures of air aging fall within the range from about 220° F. to about 325° F., and optimum times within the range from 6 to 300 hours. As an alternative method the aging may be carried out in a hydrocarbon liquid in accordance with the process disclosed in our copending application of Serial No. 499,515. Hydrocarbons suitable for this purpose must be liquid and substantially nonreactive with sulfuric acid, at aging temperatures although minor amounts of matter capable of reacting with the acid can be tolerated. These hydrocarbons should preferably have low vapor pressures at the aging temperatures, but we do not wish to exclude the possibility of using lower boiling materials in conjunction with a condenser system to prevent loss of vapors. Examples of readily available hydrocarbon liquids which are suitable for our process are saturated aliphatic higher molecular weight hydrocarbons which have been treated with sulfuric acid or removal of sulfonatable components such as, for example, certain white mineral oils. Kerosene can also be used as the aging medium if condenser systems are available. Optimum temperatures for our oil aging fall between the limits of about 220° F. and about 400° F. and optimum times within the range from 1 to 24 hours, with the times required depending on the temperatures used. We prefer to age within the temperature range from 275° to 325° F. for a period from 3 to 5 hours.

In accordance with our invention the reacted clay from the aging step, which may contain some excess unreacted acid, is then subjected to calcination under such conditions of temperature and time as to render the product substantially sulfate free. We have discovered that with the use of our carbonaceous material as taught herein decomposition of the aluminum sulfate formed during aging may be effected at calcination temperatures of about 1300° F. or lower, as opposed to the theoretical decomposition temperature of 1418° F. or the normally-employed temperature of around 1500° F. The time required for decomposition of the sulfate usually ranges from about 1 to about 24 hours. Calcination can be continued for longer than 24 hours in our process but it will be appreciated by those skilled in the art that prolonged calcination can have serious adverse effect on the finished contact masses.

Although not wishing to be held to a theoretical explanation of the chemistry involved in our clay conversion process, we have postulated that the sulfuric acid reacts with aluminum and oxygen atoms in the clay, during the aging step, to form aluminum sulfate (and/or hydrates thereof) and water, after which under heating, the hydrates decompose and the water vaporizes and later, during calcination, the aluminum sulfate breaks down to aluminum oxide and oxides of sulfur, the latter passing off as gases. Although the final adsorptive contact material has the same chemical composition as the starting clay, the former is greatly superior to the latter in adsorptive properties and catalytic cracking ability. It is assumed from this, that the said clay-acid reaction with subsequent decomposition of reaction products has the net effect of bringing about displacement of aluminum oxide in the clay structure to positions of enhanced adsorptive and catalytic utility therein.

The reasons why the presence of carbonaceous materials results in desulfation of aluminum sulfate at temperatures below its normal decomposition temperature are not clearly understood. However, it seems probable that chemical reaction between carbon and aluminum sulfate, of such nature as to accomplish desulfation of the latter at comparatively low temperatures, accounts for the heat saving advantage of our present invention. For example, carbon and aluminum sulfate might react stoichiometrically, according to the following equation, at temperatures well below the conventional 1500° F. calcination level:

$$Al_2(SO_4)_3 + 3C \rightarrow Al_2O_3 + 3CO + 3SO_2$$

We do not wish it to be inferred, from the above, that only one carbon-sulfate reaction takes place during our calcination step. There are, no doubt, a number of reactions responsible for our accomplishment of sulfate decomposition at relatively low temperatures. For instance, carbon monoxide, as produced in the above-identified reaction, or by the union of the carbon with oxygen in the atmosphere, might react with the aluminum sulfate similar to the way carbon is shown to react in the above equation. It should be understood, this equation is not necessarily considered to represent a single reaction as such, it being conceivable that merely the overall results of several mechanisms are depicted thereby. For example, the carbon might react with the aluminum sulfate to convert it to the sulfite, which in turn decomposes to $Al_2O_3$ and $SO_2$.

It should be pointed out here that for best results from the calcination step of our improved process, the combustion of carbonaceous additive to $CO_2$ should usually be avoided insofar as possible. It has previously been explained that the mere burning of carbon from clay masses to create voids therein is entirely separate and distinct from the function of carbon in our invention. An embodiment of our invention which can be used to avoid carbon combustion is one in which calcination is carried out in an inert atmosphere, such as nitrogen. When an atmosphere of air is used, however, suitable controls, which fit the appropriate circumstances, can be exercised to keep carbon loss through combustion to a minimum. For example, with small carbon dosages it might be desirable to limit the amount of air in the furnace to that initially present by admitting no fresh air during calcination. On the other hand, it might be justifiable in certain cases to use an excess of carbon and permit the presence of air so long as enough carbon remains unburned to function within the scope of our invention.

As has previously been pointed out, an important advantage of the present invention is its feature of effecting increased activity of final product. It is axiomatic that there is a close correlation between activity and surface area in adsorptive clay or activated clay products and, consequently, the surface areas of these products are frequently taken as criteria of their activities. The attached drawing which graphically portrays the relationship of space rate to surface area for kaolin and activated kaolin products, shows an increase of space rate with increase of surface area throughout the range of surface areas plotted. Space rate is, of course, a measure of catalytic activity and the aforesaid drawing definitely indicates that higher surface area in a contact mass means higher space rate, hence enhanced activity. The practice of reporting surface areas as indicia of activities will be followed hereinafter in the examples.

The space rates utilized for plotting the graph of the above-mentioned drawing were obtained using a fixed bed cracking unit having a catalyst capacity of 6.8 liters. The cracking of 56–77% East Texas gas oil at 900° F. was performed in this unit using the various catalytic materials represented on the drawing, and the space rate necessary to achieve 55 percent conversion of the gas oil feed was thereby determined for each of these materials. Space rate, usually expressed as vol./hr./vol., can be defined as the ratio of the volume of feed oil vapor passing into the catalyst bed per hour to the volume occupied by the bed itself. Although activity is an important property of cracking catalyst, good activity per se does not guarantee a commercially acceptable catalyst. A catalyst might, for example, be possessed of good activity and yet catalyze the cracking of gas oil to coke and gases at the expense of gasoline formation. The term selectivity is used to denote the ability of cracking catalysts to preferentially catalyze formation of gasoline during the cracking process and, obviously, adequate selectivity, as well as activity, is necessary in commercial petroleum cracking catalysts. Needless to say, the activity data graphically shown on the drawing were obtained from representative cracking tests, i.e., tests in which the selectivities were considered sufficiently good to permit comparison of the activities obtained thereby on a fair basis. For comparative purposes, the space rate of the commercial sub-bentonite cracking catalyst, Filtrol 62, was found to be 1.26, a value which falls within the range of those plotted in the drawing.

The surface areas used in plotting the drawing graph were calculated from adsorption isotherms (plotted from experimental data) by means of the so-called B.E.T. equation which was disclosed in an article by Brunauer, Emmett and Teller in J. Am. Chem. Soc. 60, 309–319 (1938). The data for the adsorption isotherms were obtained through the use of a McBain-Baker sorption balance, which balance (as well as its method of operation) is described in detail in volume I of "The Adsorption of Gases and Vapors" (1943), by Brunauer. Surface areas are usually reported as square meters of area per gram of adsorptive material (m.²/g.).

Following are examples which are intended for purposes of illustrating some of the advantages of our invention and for contributing to a clearer understanding of it, but which are not to be construed as limiting the invention to the particular embodiments described therein.

*Example I*

This example was a control test in which no carbonaceous additive was used.

A sample of a water-washed, pulverized Georgia kaolin clay of about 14 percent volatile matter (V.M.) content was placed in a laboratory pug mill. By volatile matter is meant that part of the clay which would be eliminated by heating the clay at a temperature of about 1700° F. to substantially constant weight. The volatile free (V.F.) clay weight would, as previously explained, be the weight of the clay without its volatile matter. Sulfuric acid of 66° Bé. strength (93.2 percent $H_2SO_4$ concentration) was added to the clay in the pug mill, and the clay and acid were then pugged to an appearance of homogeneity. The amount of acid used was equivalent to a dosage of 89 percent, acid dosage, as previously explained, being defined as the weight of 100 percent acid per weight of V.F. clay expressed on a percentage basis. The pugged mixture was extruded to form pellets 3/16 in. in diameter and 3/16 in. long and these pellets were air-aged for 24 hours at 225° ±10° F. in glass jars with loosely capped lids (standard dry process laboratory air-aging procedure). The aged pellets were calcined at 1300° F. (a temperature below the theoretical decomposition temperature of aluminum sulfate) for four hours in a nitrogen atmosphere, after which their acid number was determined. The acid number of the calcined pellets was found to be 500 mg. NaOH/g. pellets, a value which indicated little, if any, desulfation as a result of the 1300° F. calcination. The procedure for determining the acid number comprised grinding a sample of the pellets to a powder weighing a small quantity of the powder into distilled water and boiling the mixture for 10 minutes; titrating the boiled mixture with 0.1 N NaOH, using phenolphthalein as an indicator; and calculating the value of the said acid number from the titration results. Acid numbers are conventionally used in the art as criteria of sulfate content of $H_2SO_4$-treated clay products.

The surface area of the product of this example was measured and found to be only 47 m.²/g., a value considerably lower than that which would have been attained had substantial desulfation taken place during the calcination.

*Example II*

This example was similar to Example I, the only essential difference being that in the present case Norit A (an activated carbon marketed by R. W. Greeff & Co., Inc.) in amount equivalent to 11.2 percent based on the weight of 100 percent acid present, was pugged into the clay prior to addition of the acid thereto.

In addition, enough water to make an extrudable and pelletizable mix was added to the clay along with the acid, this extra water being necessary to compensate for the presence of the carbon. The acid number of the calcined pellets was determined to be only 6 mg. NaOH/g., a result indicative of relatively complete desulfation as shown by comparison with the acid number of 500 mg. NaOH/g. in Example I. The surface area of these pellets was found to be a relatively high 153 m.²/g., which shows, particularly when viewed in the light of Example I, that desulfation and development of surface area, hence activity, in such pellets go hand in hand.

Thus, it has been demonstrated that the use of carbon as taught herein makes it possible to desulfate at 1300° F. whereas, without the carbon, desulfation does not take place to any appreciable extent at this temperature.

*Example III*

This is an example of another control test without the use of carbonaceous additive, in which calcination was carried out at 1500° F.

A 2,000 gram sample of a water-washed, pulverized Georgia kaolin clay of about 14 percent V.M. was placed in a laboratory pug mill. C.P. grade sulfuric acid of 96.5 percent $H_2SO_4$ concentration was added to the clay in amount equivalent to 80 percent dosage. The clay and acid were pugged to an appearance of homogeneity and the resulting mixture was extruded to form pellets 3/16 in. in diameter and 3/16 in. long.

The pellets were air-aged in loosely capped bottles by the standard procedure (24 hr. at 225°±10° F.). The air-aged pellets were calcined at 1500° F. to substantial desulfation and afterwards their surface area was determined. During calcination, the pellets were kept blanketed with the reaction gases by limiting the admission of outsde air to that entering the furnace through natural leakage. The surface area of the air-aged pellets was found to be 99 m.²/g.

*Example IV*

This example shows the improvement in surface area brought about by the use of activated carbon as taught by our invention.

The procedure described in Example III was repeated except that 11.8 percent of Norit A, based on the weight of 100 percent acid present, was pugged into the kaolin prior to the addition of the acid and the acid dosage was 85 percent (instead of 80 percent). The acid dosage was changed slightly from that in Example III in order to obtain an extrudable mix of proper pelletizing consistency. Nort A as previously stated, is an activated carbon product of R. W. Greeff & Co., Inc. The surface area of the calcined pellets of this example was determined to be 151 m.²/g. Comparison of this surface area with that of Example III, which was 99 m.²/g., points up the substantial improvement in surface area, and hence activity, attributable to the presence of the carbon.

*Example V*

This example is the same as Example IV except that finely divided graphite was used in place of the Norit A. The surface area of the calcined pellets of this example was found to be 148 m.²/g. This value is substantially higher than the surface area of the Example III product, thus proving graphite to be an excellent additive within the scope of our invention.

*Example VI*

This example shows the effect of using fuel oil as the carbonaceous additive.

The procedure of Example III was followed in the present example, except that 11.8 percent fuel oil, based on the weight of 100 percent acid present, was pugged into the kaolin prior to the addition of the acid thereto, and instead of an acid dosage of 80 percent, as in Example III, one of only 67 percent was employed. It was necessary to reduce the acid dosage from 80 to 67 percent in order to achieve a mixture which could be satisfactorily extruded and pelletized. With an acid dosage of 80 percent the mixture would have been too "soupy" due to the presence of the liquid fuel oil. The surface area of the calcined pellets of this example was determined to be 105 m.²/g. Here again, comparison of the surface area with that of the Example III product shows fuel oil to have effected a significant increase therein, in spite of the fact that substantially less acid was employed in the present example than in Example III.

Example VII

This is an example showing the improvement in surface area attributable to the use of glycerol as the carbonaceous additive of our invention.

The procedure described in Example III was followed except that 11.8 percent glycerol, based on the weight of 100 percent acid present, was pugged into the kaolin clay prior to the addition of the sulfuric acid thereto and, instead of an acid dosage of 80 percent, only 61 percent dosage was employed. The reduction of acid dosage from 80 to 61 percent was necessary in order to achieve a mixture which could be satisfactorily extruded and pelletized.

The surface area of the final product was found to be 133 m.$^2$/g., a value substantially higher than the 99 m.$^2$/g. of its Example III counterpart, even though considerably less acid was employed in the present example. Thus glycerol has been shown to be a useful carbonaceous additive within the scope of our invention.

Example VIII

In this example and the examples to follow, aging of the formed pellets containing acid is carried out in oil rather than in air, as done in the preceding examples.

This Example VIII was a control test in which no carbonaceous additive was used. Georgia kaolin clay having a V.M. content of about 14 percent was mixed with sulfuric acid in an aqueous solution of 96.5 percent concentration and the mixture was pugged to an appearance of homogeneity. The pugged mixture was then extruded to form pellets 3/16 in. in diameter and 3/16 in. long. The pellets were then aged by immersing them in white mineral oil maintained at 305°±15° F. for a period of 4 hours, the mineral oil being Kyso 32, a product of Standard Oil Company of Kentucky. Following aging, the pellets were calcined at 1500° F. until substantially desulfated. The surface area of the calcined pellets was determined to be 95 m.$^2$/g.

Example IX

In this case the procedure of Example VIII was followed except that 11.8 percent of Norit A, based on the weight of 100 percent acid present, was incorporated into the clay-acid mixture prior to aging and that an acid dosage of 85 percent, instead of 80 percent, was employed.

It was necessary to increase the acid dosage slightly over that of Example VIII in order to obtain an extrudable mix of proper pelletizing consistency.

The surface area of the calcined pellets of this example was determined to be 105 m.$^2$/g. From a comparison of this surface area with that of the pellets of Example VIII, which was 95 m.$^2$/g., it will be seen that a substantial improvement in surface area is obtained with the addition of activated carbon.

Example X

The procedure of Example IX was repeated except that finely divided graphite was used in place of the Norit A. The surface area of the calcined pellets of this example was measured and found to be 126 m.$^2$/g. which, when compared with the surface area of the pellets of Example VIII, shows graphite to be especially suitable for purposes of our invention.

Example XI

In this example the effect of incorporating fuel oil in the clay-acid mixture as the carbonaceous additive is shown. The procedure of Example VIII again was followed except that 11.8 percent of fuel oil, based on the weight of 100 percent acid present, was pugged with the kaolin prior to the addition of the acid and the acid dosage was reduced from 80 percent to 67 percent in order to produce a mixture which could be satisfactorily extruded and pelletized. The surface area of the calcined pellets of this example was determined to be 116 m.$^2$/g. as compared with 95 m.$^2$/g. for the calcined pellets of Example VIII which were produced without the use of the carbonaceous additive. This again demonstrates the improvement in surface area which is obtained in accordance with our invention using fuel oils as the carbonaceous additive therein.

Example XII

The purpose of this example is to show the effect of using white mineral oil as the carbonaceous additive in combination with oil-aging. The procedure of Example VIII once again was repeated except that 11.8 percent of Kyso 32, based on the weight of 100 percent acid present, was incorporated into the kaolin clay as the carbonaceous material prior to the addition of the sulfuric acid and, in order to produce an extrudable and pelletizable mix, the acid dosage was reduced from 80 percent to 72 percent.

The surface area of the calcined pellets was found to be 126 m.$^2$/g., a value substantially higher than the 95 m.$^2$/g. for the pellets of Example VIII in which the carbonaceous additive was not employed.

We claim:

1. A process for the preparation of adsorptive contact masses from an acid activatable clay comprising the steps of mixing said clay with sulfuric acid in an amount of from 60 per cent to 100 per cent by weight based on the volatile free weight of said clay and with from 3 to 20 parts by weight of a carbonaceous material per 100 parts of said sulfuric acid, forming shaped masses from the resulting mixture, reacting said clay with said sulfuric acid, and then, without washing out water soluble reaction products, desulfating the reacted mixture by calcining said mixture in an atmosphere such as to avoid direct combustion of the carbonaceous material to $CO_2$.

2. A process for the preparation of adsorptive contact masses from an acid activatable clay comprising the steps of mixing said clay with sulfuric acid in an amount of from 60 percent to 100 percent by weight based on the volatile free weight of said clay and with from 3 to 20 parts by weight of a carbonaceous material per 100 parts of said sulfuric acid, forming shaped masses from the resulting mixture, reacting said clay with said sulfuric acid, and then, without washing out water soluble reaction products, desulfating the reacted mixture by calcining said mixture at a temperature of from about 1250° F. to about 1450° F. in an atmosphere such as to avoid direct combustion of the carbonaceous material to $CO_2$.

3. A process for the preparation of adsorptive contact masses from a kaolin clay comprising the steps of mixing said clay with sulfuric acid in an amount of from 60 percent to 100 percent by weight based on the volatile free weight of said clay and with from 3 to 20 parts by weight of a carbonaceous material per 100 parts of said sulfuric acid, forming shaped masses from the resulting mixture, reacting said clay with said sulfuric acid, and then, without washing out water soluble reaction products, desulfating the reacted mixture by calcining said mixture at a temperature of from about 1250° F. to about 1450° F. in an inert atmosphere.

4. The process of claim 3 in which the carbonaceous material is finely divided amorphous carbon.

5. The process of claim 3 in which the carbonaceous material is powdered graphite.

6. The process of claim 3 in which the carbonaceous material is mineral oil.

7. The process of claim 3 in which the carbonaceous material is glycerol.

8. A process for the preparation of adsorptive contact masses from kaolin clay comprising the steps of mixing kaolin clay with sulfuric acid in an amount of from 60 percent to 100 percent by weight based on the volatile free weight of said kaolin clay and with from about 3 to 20 parts by weight of a carbonaceous material per 100 parts of said sulfuric acid, extruding said mixture to form pellets thereof, reacting said sulfuric acid by aging said pellets at a temperature of from 220° F. to 400° F., and then washing out water soluble reaction products, calcining said pellets at a temperature of from about 1250° F. to about 1450° F. for 1 to 24 hours in an inert atmosphere to substantially eliminate sulfate therefrom.

9. The process of claim 8 in which the carbonaceous material is amorphous carbon.

10. The process of claim 8 in which the carbonaceous material is powdered graphite.

11. The process of claim 8 in which the carbonaceous material is mineral oil.

12. The process of claim 8 in which the carbonaceous material is glycerol.

References Cited in the file of this patent

UNITED STATES PATENTS

| | | |
|---|---|---|
| 1,133,446 | Richter | Mar. 30, 1915 |
| 1,634,514 | Rial et al. | July 5, 1927 |
| 1,752,721 | Bierce | Apr. 1, 1930 |
| 1,781,265 | Baylis | Nov. 11, 1930 |
| 1,827,165 | Pfaff et al. | Oct. 13, 1931 |
| 2,044,341 | Wollner | June 16, 1936 |
| 2,192,000 | Wilson | Feb. 27, 1940 |
| 2,400,020 | Pierce et al. | May 7, 1946 |
| 2,485,626 | Mills | Oct. 25, 1949 |
| 2,787,599 | Belden | Apr. 2, 1957 |

FOREIGN PATENTS

| | | |
|---|---|---|
| 239,169 | Great Britain | July 6, 1926 |

UNITED STATES PATENT OFFICE

CERTIFICATE OF CORRECTION

Patent No. 2,988,519  June 13, 1961

Alfred J. Robinson et al.

It is hereby certified that error appears in the above numbered patent requiring correction and that the said Letters Patent should read as corrected below.

Column 2, line 51, for "to", second occurrence, read -- too --; column 4, line 75, for "or" read -- for --; column 8, line 39, for "Nort" read -- Norit --; column 9, line 68, for "incorporatng" read -- incorporating --; column 11, line 5, for "then washing" read -- then, without washing --.

Signed and sealed this 15th day of May 1962.

(SEAL)
Attest:

ERNEST W. SWIDER
Attesting Officer

DAVID L. LADD
Commissioner of Patents